Jan. 8, 1957

G. A. BRACE 2,776,726

SUCTION CLEANER AND FILTER THEREFOR

Filed Jan. 7, 1954

INVENTOR.
George A. Brace
BY
ATTORNEY.

Jan. 8, 1957

G. A. BRACE 2,776,726

SUCTION CLEANER AND FILTER THEREFOR

Filed Jan. 7, 1954

INVENTOR.
George A. Brace
BY
ATTORNEY.

Jan. 8, 1957 G. A. BRACE 2,776,726
SUCTION CLEANER AND FILTER THEREFOR
Filed Jan. 7, 1954 4 Sheets-Sheet 3

INVENTOR.
George A. Brace
BY
ATTORNEY.

Jan. 8, 1957  G. A. BRACE  2,776,726
SUCTION CLEANER AND FILTER THEREFOR
Filed Jan. 7, 1954  4 Sheets-Sheet 4

INVENTOR.
George A. Brace
BY
ATTORNEY.

United States Patent Office 2,776,726
Patented Jan. 8, 1957

2,776,726

SUCTION CLEANER AND FILTER THEREFOR

George A. Brace, Highland Park, Ill., assignor to The Hoover Company, North Canton, Ohio, a corporation of Ohio Application January 7, 1954, Serial No. 402,716

16 Claims. (Cl. 183—37)

This invention relates to suction cleaners and more particularly to a unique cleaner construction utilizing a novel disposable filter bag and a more facile and effective means of mounting the same within the cleaner.

While the use of throw-away paper filters for suction cleaners has long been attractive to the housewife, their use has been limited and attended by many disadvantages. The numerous unsolved problems include complex and ineffective clamps for mounting the filter within the cleaner and the filter constructions have been too complicated for low cost production or so simple as to introduce troublesome installation and removal problems. In other designs, the filter assembly and disassembly procedures are too involved to be carired out properly by mechanically inept operators.

These disadvantages and problems so characteristic of constructions heretofore known are entirely overcome by the present invention in which the user merely drops a simple and inexpensive throw-away paper filter into the filter chamber and closes the end cap. Removal of the dirty filter is accomplished by opening the end cap and lifting the filter out of the cleaner. The unique filter is provided with a self-closing valve thereby safeguarding against the escape of dirt during handling of the filter and a design whereby the operator may grasp any accessible portion of the bag to effect its removal without fear of soiling her hands. Nor is it necessary to give attention to operating any mechanism in order to clamp the air inlet tube to the paper filter since this operation is carried out automatically as an incident to the closing of the end cap.

Another feature of the invention is an arrangement whereby the cleaner can be operated with or without the paper filter bag without danger of fouling the paper filter clamping facilities or otherwise adversely affecting the cleaner.

Accordingly, it is a primary object of the present invention to provide a novel suction cleaner as well as a new and simplified throw-away paper filter.

A further object is the provision of a suction cleaner having a new and improved mode of clamping a paper filter in place therein merely by closing the end cap.

Still another object is the provision of a suction cleaner constructed and arranged to utilize the suction pressure of the motor-fan unit to maintain an airtight seal between the filter inlet and cleaner inlet so long as the cleaner is operating.

Yet another object is the provision of a non-reusable filter bag having a flat bottom with an inlet opening therein and of a unique cleaner adapted to receive the filter and support the same from the edges of its bottom.

Another object is the provision of filter clamping means which stretches taut a portion of the wall provided with an inlet together with means for sealing the air inlet tube to the filter inlet in an airtight manner.

A further object is the provision of a new filter bag having a valved inlet and made from a single sheet of paper material.

Numerous other objects and advantages of the invention will become apparent from the following detailed specification of two illustrative embodiments taken in connection with the accompanying drawings, wherein.

Figure 1:
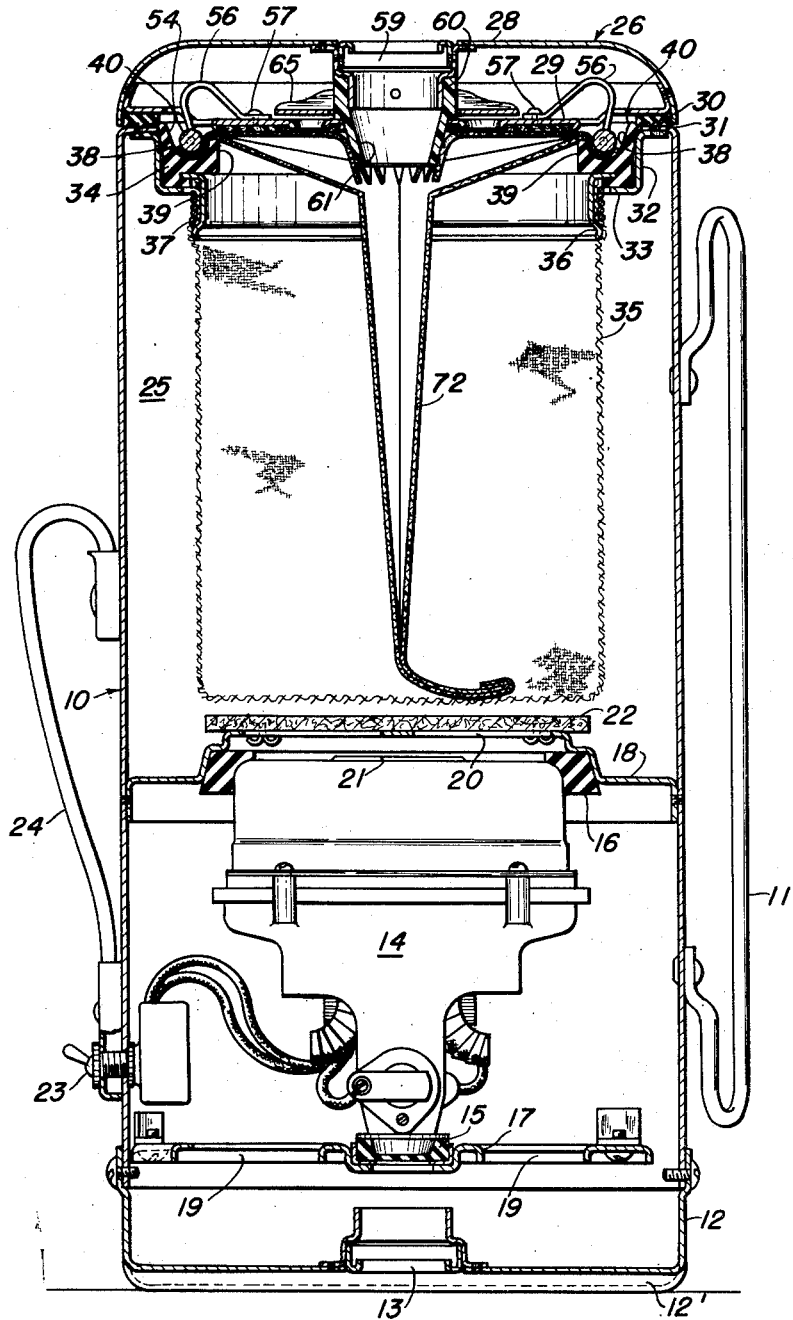
Figure 1 is a vertical sectional view taken along line 1—1 on Figure 3 with the cleaner upended on its rear end as it would be during servicing of the filter facilities, and showing a new filter installed but not inflated.

Referring now to the drawings and to Figures 1 to 6 showing a preferred embodiment of the invention, it will be seen that the cleaner comprises a casing 10 formed from a tubular member of rectangular shape. Ordinarily the casing is supported in a generally horizontal position on the floor by a pair of runners or skids 11. However, it is sometimes advantageous to employ the cleaner while in the up-ended vertical position illustrated in Figure 1. Accordingly, the rear end cap is shown as provided with a pair of skids 12' adapted to hold the combined air discharge and blower hose coupling 13 spaced above the floor for the free exit of air.

A conventional type of multiple stage motor-fan unit 14 is suitably supported at the rear end of the casing by a pair of soft rubber gaskets 15 and 16 supported in partition members 17 and 18, respectively. Partition 17 is formed as a spider having air openings 19, whereas partition 18 is impervious except in its central portion where it is provided with air openings 20 which allow air to pass into the suction inlet 21 of the fan unit. A final filter 22 of fiber glass, belting, or the like, overlies openings 20 for the purpose of removing any dirt which may pass through the filter proper and particularly for preventing large articles from entering the fan by accident or otherwise. The fan is provided with one or more peripheral air discharge ports which cause the clean air to flow over the driving motor to cool it as the air passes to the air discharge port 13. A toggle switch 23 is conveniently mounted on the upper side of the cleaner casing and is connected to the motor so as to control the operation thereof in a well known manner. A suitable carrying handle 24 also extends along the top side of the casing for convenience in carrying the cleaner from place to place.

The forward end of casing 10 forms a filter chamber 25 which is accessible through the open forward end of casing 10 which is normally closed by an end cap 26 hinged to one edge of the cleaner casing, as by hinge 27. This end cap includes an outer wall 28 and an inner wall 29. The rim of the latter is provided with a resilient gasket 30 arranged to seat firmly against the inturned rim 31 of the cleaner casing when the end cap is locked in closed position as by a conventional toggle clamp 71.

Secured to the inner side of rim 31 is a flanged filter seating ring 32 having an inturned flange 33 adapted to removably seat the semi-rigid rubber mounting ring 34 for a cloth filter bag 35. Filter bag 35 is rigidly secured to a channeled ring 36 having one rim imbedded in the rubber ring 34 as illustrated in Figure 1. The means of securing the cloth filter to ring 36 comprises one or more turns of wire 37, a metal clamping band or any other suitable means.

Figure 2:
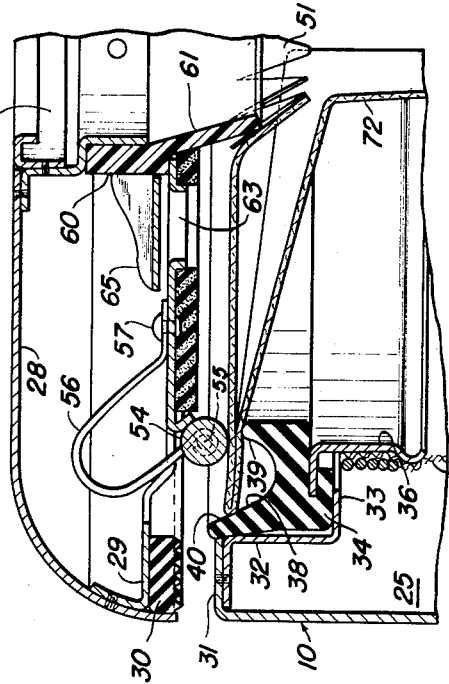
Figure 2 is an enlarged fragmentary sectional view through the top of the filter end of the cleaner as the end cap approaches closed position and begins to clamp the filter.

Referring to Figures 1 and 2 in particular, it will be seen that the rubber ring 34 for the cloth filter is of generally rectangular shape and that each of the outer faces of its opposite longer sides is provided with a channel or trough 38. The adjacent inner lips 39 of the troughs are rounded and located at an appreciably lower level than the outer lips 40 of the troughs. The reason for this will become apparent shortly.

Figure 5:
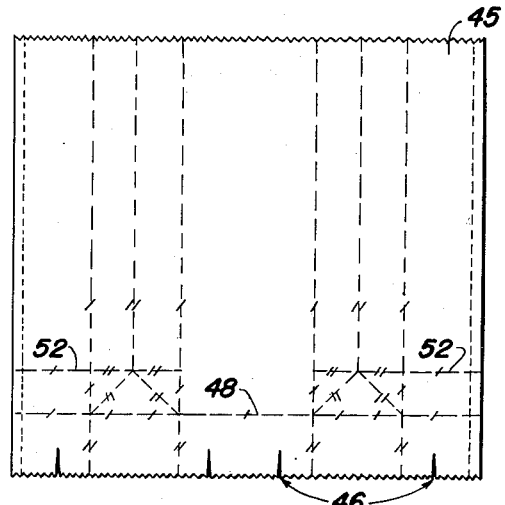
Figure 5 is a plan view of the paper blank used in forming the one piece throw-away filter bag.

Before proceeding to a description of the novel filter clamping means, reference will be had to the construction of the unique one-piece filter bag preferably employed with my cleaner. The construction of the filter will be best understood by reference to Figures 5 to 8. Figure 5 shows the rectangular blank of suitable paper filter material 45 having impressed therein crease lines disposed as represented by the dash lines. Those crease lines having a single dash line thereacross are creased in a direction opposite to those having a pair of dash lines thereacross. The two groups of longitudinal creases provide for the inwardly folded side pleats, while the transverse crease lines near one end of the blank and those at an angle of 45° thereto are used to form the bottom of the bag. Note that the bottom edge of the blank is provided with four vertical slits 46 the ends of which terminate opposite the projections of the short diagonal crease lines.

Figure 6:
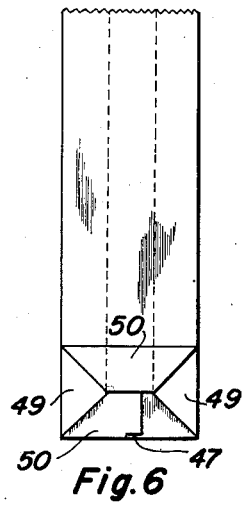
Figure 6 is a plan view of the bag during one of the initial manufacturing operations.
Figure 7:
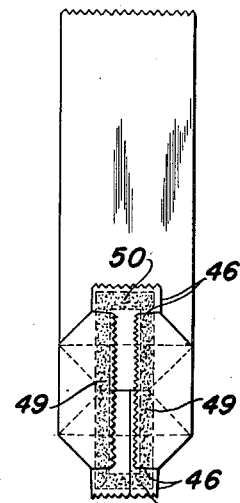
Figure 7 is another view showing the bottom of the bag folded ready for the application of glue.

The bag is formed by overlapping and gluing the opposite edges of the blank together as indicated at 47 in Figure 6. The side pleats are then folded inwardly and the tubular body of the bag is flattened. The flat bottom of the bag joins the side walls along the transverse crease line 48 and is formed by folding the bottom end of the flattened tube upwardly at right angles to the body of the bag along crease line 52. At this stage, the bag presents the appearance shown in Figure 6. Thereafter, the opposite side flaps 49 adjacent the pleated sides are folded inwardly toward one another while the side flaps 50, 50 of the bottom are folded away from one another, as shown in Figure 7. A rectangular strip of glue is then applied across the edges of flaps 49 and 50, as indicated by dotted lines in Figure 7. First one and then the other of flaps 50 are then folded in overlapping relation along crease line 48 to form the completed bottom.

Figure 8:
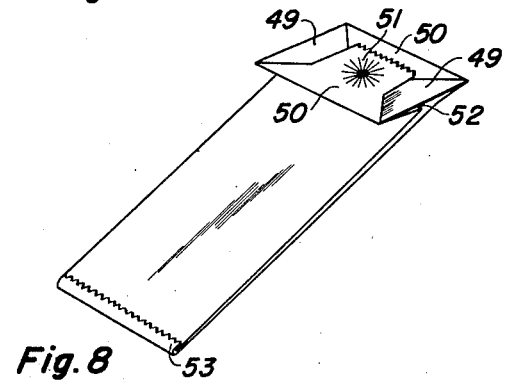
Figure 8 is an isometric view of the finished throwaway filter as it is taken from the shipping carton.

The only operations required to complete the filter bag is to close the open end of the bag and slit the bottom to form the pie-shaped self-closing sectors 51 for the inlet opening as illustrated in Figure 8. The ends of the slits terminate at the edge of a circle somewhat larger than the exterior of pilot 61 on the end of the air inlet tube. The opposite end 53 of the filter bag folds flat for packaging and with shipment the bottom lying flat against the body of the bag and being folded thereagainst along crease line 52, as indicated in Figures 5 and 8.

Figure 3:
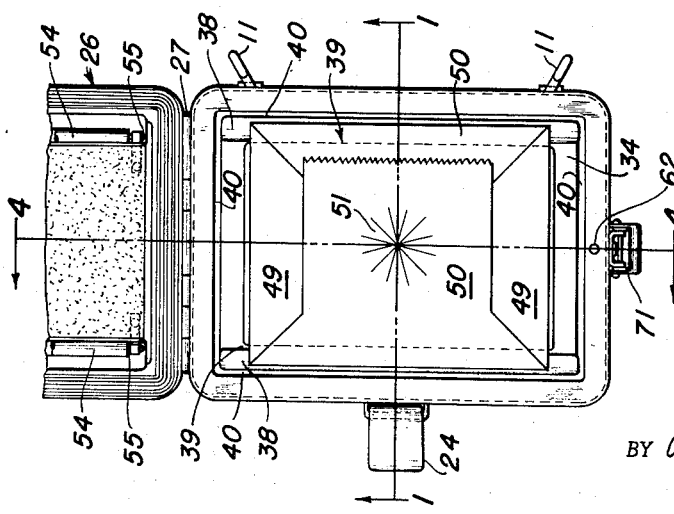
Figure 3 is a top plan view of the filter end of the cleaner with the end cap open and the bottom of a new filter supported across the clamping grooves.

From the foregoing it will be readily apparent that the flat bottom of the bag can be quickly unfolded to lie in a plane at right angles to the still flattened main body of the bag as it is removed from the shipping carton. There is no tendency for pleats of the body of the bag to open and it is a simple matter to drop the bag vertically into the open top of the filter chamber by grasping one side edge of the flat bottom of the bag. Referring to Figure 3, it will be noted that the narrow width of the bag bottom is slightly less than the distance between the facing edges of lips 40 projecting upwardly from the face of resilient ring 34. Since the tops of lips 40 are higher than the tops of lips 39 and since the length of the bag bottom is slightly less than the longer internal dimension of gasket 34, the filter bag is quickly and accurately positioned within the filter chamber merely by allowing it to drop into the open top of the chamber.

The clamping means for the filter comprises a pair of rollers 54 having trunnions 55 projecting from their opposite ends which are journaled in two pairs of U-shaped leaf springs 56 housed principally between the inner and outer walls of the end cap and secured to the end cap as by rivets 57. The normal unstressed position of springs 56 when the cap is in open position is best shown in Figure 2. Note that the axis of clamping rollers 54 is slightly on the channel side of lips 39 of the gasket ring. In consequence, clamping rollers 54 are forced to ride off lips 39 into channels 38 as the end cap is closed. In so doing, the rollers depress the opposite side edges of the bag bottom into the channel and pull the intervening portion of the bag bottom taut as they clamp it securely against the bottom of channels 38.

The air inlet facility for the filter comprises a female suction hose socket 59 secured across an opening in the outer wall 28 of the end cap. Firmly secured to the inner end of this socket is a resilient filter seating tube 60 having a frusto-conical inner end or pilot 61 positioned to register with and project through the inlet opening of the filter bag and, in so doing, to depress the pie-shaped self-closing valve sectors 51 of the bottom of the filter bag inwardly as shown in Figure 1. Since the slits forming the pie-shaped sectors preferably have a length slightly in excess of the outer diameter of pilot 61, they do not flex inwardly from the bottom of the filter along a sharp crease line; rather the sectors will flex inwardly along a gradual curve and will readily resume their original flat position across the plane of the opening as soon as the end cap is opened. Thus, these sectors form a self-closing valve which opens easily to permit the entrance of the pilot tube and which again close automatically in response to their inherent resiliency as soon as the tube is withdrawn.

Figure 4:
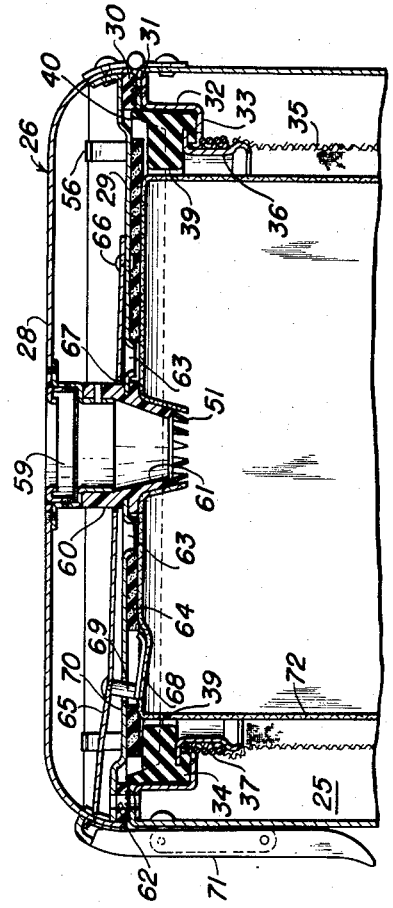
Figure 4 is a fragmentary sectional view along line 4—4 on Figure 3 showing the automatic air vent valve held open by contact with the taut bottom of the paper fitler.

The means for forming an airtight seal between the bottom of the filter and the air inlet passage formed by tube 60 and pilot 61 makes use of the suction pressure of the suction fan to press the bottom of the filter tightly against inner wall 29 of the cleaner end cap. Referring to Figure 4, it will be seen that a small air passageway 62 extends through flanged ring 32, inturned flange 31, sealing gasket 30 and inner wall 29 of the end cap. Accordingly, this passage 62 maintains the space between the inner and outer walls of the end cap at substantially the same low pressure existing at inlet 21 of the suction fan. Extending through inner wall 29 of the end cap in the area surrounding pilot tube 61 are one or more openings 63. Accordingly, the low air pressure existing between the walls of the end cap is communicated to the space immediately above the bottom wall of the filter. This low pressure together with the considerably higher pressure existing within the filter bag forces the bottom of the filter into airtight sealing engagement with the inner wall of the end cap. Greater assurance of an airtight seal is provided by a soft rubber pad or the like 64 carried by the inner side of wall 29 of the end cap.

Under certain operating conditions, the user may wish to use the cleaner without the throw-away paper filter, reliance then being had on the cloth filter bag 35 to filter the dirt from the air entering the cleaner. Under these circumstances it is, of course, undesirable for air passages 62 and 63 to be open since dirty air could then pass therethrough from the air inlet passageway into the interior of the filter chamber without passing through filter 35.

The present invention safeguards against this possibility by the provision of a light spring plate 65 having one end secured to wall 29 of the end cap as by rivets 66. As best shown in Figure 4, plate 65 has a large opening 67 through which the pilot tube 60 extends freely. The free outer end of plate 65 is positioned to overlie passage 62. A wide area pad 68 is carried by a stud 69 projecting downwardly through a larger diameter opening 70 in the end cap wall. Normally, spring plate 65 lies snugly against openings 62 and 63 and prevents air flow therethrough. However, if a paper filter is clamped in place in the cleaner, pad 68 will contact the taut bottom of the bag and lift spring plate 65 to open passages 62 and 63, thereby allowing free air flow therethrough. On the other hand, if the user neglects to install a paper filter there will be nothing in the path of pad 68 as the end cap closes to open the valve 65 and the valve will remain closed thereby safeguarding against the flow of dirty air in a path bypassing filter bag 35. It will, of course, be obvious that the upper end of passages 62 and 63 may be provided with resilient seats against which the valve spring presses, should this be deemed desirable.

*Operation*

Let it be assumed that the operator wishes to install a fresh throw-away paper filter. The cleaner is upended onto skids 12' secured to the rear end cap. Toggle clamp 71 is then opened to release the inlet end cap 26 so that it can be swung to its open position to one side of the cleaner body. The operator then grasps one edge of the bottom of a new paper filter and opens it until it is at 90° to the collapsed body of the bag. Holding the bag in this manner, it is dropped into the open filter chamber and allowed to come to rest with its opposite longer sides resting on ribs 39 of the resilient sealing ring 34. The sloping inner sides of ribs 40 will accurately center the bag in the clamping ring without attention from the operator. All that remains to be done by the operator is to close and latch the end cap by toggle clamp 71.

As the end cap approaches closed position, the ends of the clamping rollers 54 adjacent the hinged end of the end cap will contact the upper outer edges of ribs 39 and gradually pull the bottom of the filter taut as the rollers ride off ribs 39 and into channels 38. The U-shaped supporting springs 56 will then hold the edge of the bag firmly and resiliently clamped in place in channels 38. Before the end cap is fully closed but after rollers 54 have a firm grip on the edges of the filter bottom, pilot 61 will contact the valve sectors 51 and deflect them inwardly to the position shown in Figure 1 as the end cap is finally seated.

Another operation that takes place during the closing of the end cap is the contact of pad 68 carried by valve 65 with the bottom of the filter, thereby moving the valve away from its closed position across openings 62 and 63. The cleaner is now ready for return to its normal operating position on runners 11. When switch 23 for the motor is closed, the motor will be energized and will suck dirt laden air through the inlet passageway 59 thereby expanding the paper filter to its fully open position.

After a quantity of dirt has collected and it is desired to replace the throw-away filter bag with a clean one, only a moment of the operator's time is required. She merely upends the cleaner onto its rear end, releases toggle clamp 71 and swings the end cap to open position. As pilot 61 emerges from the inlet opening, valve members 51 spring back to their normal position in the plane of the bag bottom, thereby preventing the escape of dirt into the room. The edge of the bag bottom is then grasped between the operator's fingers and withdrawn upwardly from the filter chamber. The cleaner is restored to operation by installing a new filter bag as described above.

Should the user's supply of throw-away filter bags be exhausted, or should she wish to clean without employing a throw-away filter, she may do so merely by closing the end cap and locking it in place. In the absence of a paper filter, there is nothing for pad 68 to contact and valve 65 will remain closed and will confine the flow of air to a path traversing the cloth filter 35. When this filter becomes filled with dirt, it may be readily removed from the cleaner by opening the end cap and lifting the resilient ring 34 together with filter 35 from the casing for convenience in emptying the dirt. The filter is then replaced and the cleaner may be returned to use with either the cloth filter, or in combination with a throw-away filter as the user elects.

*Second embodiment*

Figure 9:
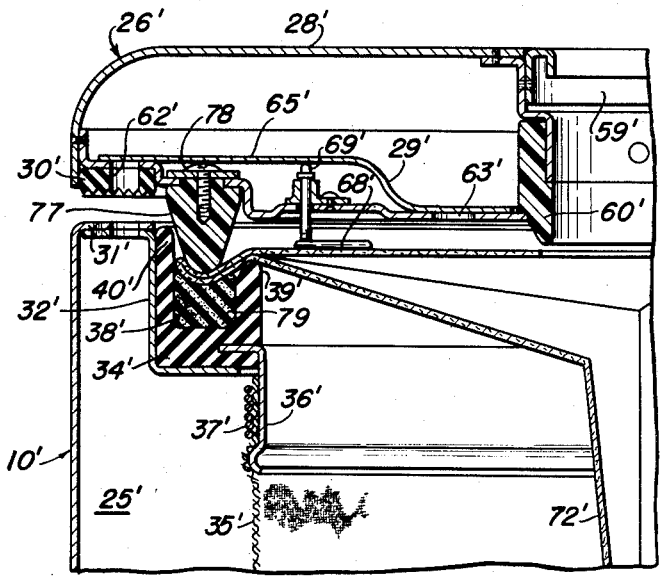
Figure 9 is a fragmentary view similar to Figure 2 but showing a modified version of the invention.
Figure 10:
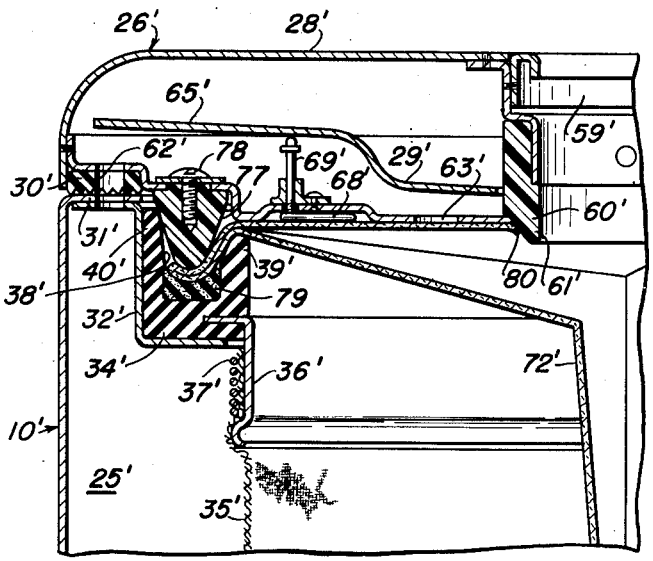
Figure 10 is another fragmentary view showing the filter of the modified version clamped in place and inflated.

The second embodiment of the invention is shown in Figures 9 and 10, wherein the same or similar parts are designated by the same reference characters as in the first embodiment but are distinguished by a prime. It will be observed that the principal distinction resides in the replacement of the clamping rollers 54 and the spring mounting members 56 therefor with a pair of rubber or the like ribs 77 secured by screws 78 to the opposite sides of the inner wall 29' of the cover. The lower rounded edges of ribs 77 overlie channels 38' of the rubber mounting ring for cloth filter bag 35'. Secured to the bottoms of channels 38' are rather thick strips of sponge rubber 79 against which ribs 77 depress the opposite edges of the bottom of the throw-away filter 72'. Figure 9 illustrates the position of the parts as the end cap is closing and is beginning to depress the edges of the filter bottom against pads 79, while Figure 10 shows the end cap closed and the edges of the bag firmly clamped between the lower edges of ribs 77 and pads 79.

Note that in the closed position of the end cap the inner wall 29' thereof lies flush against the taut bottom of the throw-away filter and that actuator pad 68' for the spring valve 65' has been pushed to its upper position thereby opening ports 62' and 63'. Accordingly, the low pressure existing at the fan inlet is conveyed by ports 62' and 63' to the space between the inner side of end cap wall 29' and the bottom of the filter bag. As a result, the bottom of the bag is held in tight engagement with the inner wall of the end cap and prevents dirty air from the interior of the filter from flowing directly to the fan inlet.

It is to be observed also that filter bag 72' omits the pie-shaped valve sectors at its inlet opening. Instead, the rim of the opening 80 into the filter may be notched or slit radially at spaced points along its edge to facilitate the entry of the frusto-conical rubber pilot 61'. It will, of course, be obvious that the self-closing valve structure described in connection with the first embodiment may be used with the second embodiment without making any modification of the structure.

While the sponge rubber sealing pad corresponding to pad 64 of the preferred embodiment has not been shown in the simplified second emobdiment, it will be manifest that one may be employed if desired. However, I have found that an adequate air seal is obtained merely by utilizing the pressure differential across the bottom of the bag to press the same into airtight engagement with wall 29' of the end cap.

The operation of the second emobdiment differs in no material respects from that discussed above for the first embodiment and for this reason need not be repeated here.

From the foregoing description of two illustrative embodiments of my invention, it will be appreciated that I have provided a very simple cleaner construction adapted to employ a most inexpensive throw-away paper filter and by which the filter may be installed and removed with a minimum of effort. All that is required is for the operator to open the end cap, drop a new bag into the filter chamber and close the end cap. The filter is guided into proper position by virtue of the special shape of the filter chamber and of the filter bag. Moreover, it is locked in position and automatically clamped to the air inlet passage in an airtight manner without any attention or special operations of any kind on the part of the operator. Furthermore, upon the opening of the end cap, the means for locking the filter in place is automatically released and the inlet opening to the filter closes automatically as an incident to the opening of the end cap.

While I have shown and described but two embodiments of my invention, it is to be understood that those embodiments are to be taken as illustrative only and not in a limiting sense. I do not wish to be limited to the particular structures shown and described but to include all equivalent variations, except as limited by the scope of the claims.

I claim:

1. A suction cleaner having a casing for a motor driven suction unit, a filter chamber in communication with said suction unit and having a large area inlet opening through the wall thereof for the installation and withdrawal of a filter bag, filter supporting ledges extending along the oppositely disposed interior sides of said filter chamber inwardly of said inlet opening, a disposable paper filter bag in said filter chamber having an end wall integral with the contiguous side walls thereof and being formed of the same air pervious material, rim edges of said side walls and the opposed rim edges of said end wall being folded together to form clamping tabs, said tabs being spaced apart sufficiently to overlie said filter supporting ledges when the filter bag is assembled into said filter chamber, guide means positioned above and outwardly of said ledges for contact with said tabs as said bag is inserted through said opening and operable to guide said tab onto said ledges and clamping means on said cleaner for engaging said tabs and holding them firmly against said filter supporting ledges.

2. A suction cleaner having a casing for a motor driven suction unit, a filter chamber in communication with said suction unit and having a large area inlet opening for the installation and withdrawal of a filter bag, filter supporting means extending inwardly from the opposite rim edges of said inlet opening, a disposable paper filter bag having an air inlet opening through the wall thereof, said filter having a pair of mounting tabs extending crosswise of said filter wall on the opposite sides of said air inlet opening, said tabs being formed by folding strips of said filter walls together along crease lines at either side of said air inlet and spaced apart a distance sufficient to bridge said filter supporting means on the opposite rim edges of said filter chamber inlet opening, guide means positioned above and outwardly of said filter supporting means for contact with said tabs as said bag is inserted through said opening and operable to guide said tabs onto said filter supporting means, and a closure for said inlet opening having an air inlet passage positioned to mate with said filter air inlet when said closure is in closed position.

3. A suction cleaner having a casing forming an enclosure for an air suction unit, an open ended filter chamber in communication with said air suction unit, filter supporting ledge means projecting inwardly from opposed rim edges of the open end of said chamber, a paper filter bag having a tubular main body pleated longitudinally thereof and having a closed end wall formed from the inturned side walls of said main body, said end wall being wide enough in at least one dimension for the opposite rim edges thereof to overlie and bridge the distance between said supporting ledge means, guide means positioned above and outwardly of said ledge means for contact with said tabs as said bag is inserted through said opening and operable to guide said tabs onto said ledge means, an air inlet opening through said filter end wall, a closure member for said open ended chamber having means thereon positioned to contact and depress the rim edges of said filter wall into firm seating engagement with said ledge means as said closure member is closed, and an air passage through said closure positioned to mate with said filter air inlet when the closure member is in closed position.

4. A suction cleaner filter chamber, a suction unit in communication therewith, a filter access opening through the wall of said chamber, a cover member for said opening having an air passage therethrough, a tubular filter bag closed at its opposite ends and disposed in said chamber, said filter bag having an air inlet opening in a wall thereof adapted to mate with the inner end of said air passage through said cover member, and means including filter supporting and clamping means coacting with each other for stretching the wall of said filter taut from the opposite sides of said air inlet opening and in a plane extending across the inner end of said passage.

5. A suction cleaner filter chamber as defined in claim 4 wherein a rigid plate like member surrounds and is sealed to the inner end portion of said air inlet passage in a plane closely adjacent the plane of said tensioned filter wall, and means for reducing the pressure between said plate like member and said tensioned filter wall to a pressure below that obtaining within said filter bag whereby the pressure differential across said tensioned filter wall holds the same snugly against said plate like member to form an airtight seal between said filter bag and said air inlet conduit.

6. In combination a suction cleaner having a filter chamber with a large filter access opening, a cover for said access opening, an air inlet conduit through said cover, means for supporting a paper filter bag within said chamber with a wall thereof positioned closely adjacent the inner wall of said cover, said filter bag having an inlet opening in registry with the inner end of said air inlet conduit, a suction creating means having an inlet in communication with said filter chamber exteriorly of said filter bag, and duct means connecting the surface of said filter wall against the juxtaposed area of said cover to the inlet of said suction creating means whereby said filter wall is moved into airtight engagement with said cover in the area surrounding said air inlet conduit so long as said suction creating means is operating.

7. The combination defined in claim 6 wherein the inner side of the cover for said access opening includes a resilient pad against which the wall of said filter seals when said suction creating means is operating.

8. In combination, a suction cleaner filter chamber having a large area opening, flange means at said opening for seating the mounting ring of a cloth filter bag, a cloth filter in said filter chamber having a mounting ring seated on said flange means, a pair of outwardly facing grooves extending along the opposite sides of said mounting ring, a disposable paper filter having an end wall of a width to bridge said mounting ring with its opposite rim edges overlying said grooves, said end wall having an air inlet opening therethrough, a cover for said filter chamber having an air inlet conduit positioned to mate with said filter inlet when said cover is in place over said large area opening, said cover having means on its inner side positioned in alignment with said pair of grooves and arranged to depress the rim edges of said filter end wall thereinto as the cover is closed to thereby clamp said filter in place with its end wall under tension and lying flush against the inner side of said cover in the area surrounding said air inlet conduit.

9. The combination defined in claim 8 wherein the inner lips of said pair of grooves are lower in height than the opposite remotely spaced higher lips, and the width of said disposable filter end wall being slightly less than the distance between said higher lips whereby said higher lips serve to guide the filter end wall into its proper assembled position between said higher lips and with the rim edges thereof resting across the edges of said lower lips.

10. The combination defined in claim 8 wherein the means on the inner side of said cover for depressing the opposite rim edges of the filter end wall into said grooves comprises a pair of ribs secured to said cover with their free edges in alignment with said grooves and shaped to cooperate therewith in clamping the rim edges of the filter end wall as the cover is closed.

11. The combination defined in claim 8 wherein the means on the inner side of said cover for depressing the opposite rim edges of the filter end wall into said grooves includes a pair of rollers resiliently mounted on said cover opposite said grooves and normally tending to occupy a position closer to the inner adjacent lips of said pair of grooves than to the outer more remote lips thereof whereby as the cover closes said rollers depress the rim edges of the filter end wall against said inner lips and then roll said rim edges into said grooves in a manner placing said filter end wall under tension.

12. The combination defined in claim 8 including a suction fan having an inlet in communication with said filter chamber exteriorly of said cloth and paper filters, air passage means placing said fan inlet in communication with the surface of said paper filter end wall adjacent the inner side of said cover in the area surrounding said air inlet conduit whereby said end wall is moved into airtight sealing engagement with said cover, and valve means for closing said air passage means when said cloth filter is being used alone and for opening said air passage means when a paper filter is clamped in place in said filter chamber.

13. A suction cleaner filter chamber having a large area opening to receive a filter bag, means having a pair of elongated outwardly facing grooves arranged along the inner opposite rims of said opening for supporting a paper filter bag, a paper filter bag having a tubular pleated main body and a flat end wall of regular polygon shape, opposite side rim portions being spaced to overlie said grooves when said filter is assembled into said chamber with said end wall outermost, a cover for said opening having a pair of members on its inner wall in alignment with said grooves and arranged to depress the side rim portions of said filter end wall into clamping engagement with said grooves as said cover is closed over said opening.

14. A suction cleaner filter chamber having an opening to receive a filter bag, a hollow cover member normally held in closed position across said opening, said cover having an air inlet conduit extending therethrough, means on the opposite sides of said chamber opening for supporting the opposite rim edges of a filter bag end wall having a width to bridge said supporting means, said end wall including an inlet opening, means on the inner side of said cover positioned to cooperate with said supporting means to clamp the opposite rim edges of a filter end wall to hold the end wall therebetween and to hold the end wall taut flush against the inner side of said cover with its inlet in registry with the inner end of said air inlet conduit, the inner side of said cover having a first opening therethrough in an area opposite the end wall of a filter clamped in place in said chamber and a second opening therethrough in an area uncovered by the filter end wall, and suction creating means having its inlet in communication with said second opening whereby said suction creating means is operative through said first and second openings to reduce the pressure between the end wall of a filter and the juxtaposed surface of the cover for the purpose of holding the filter end wall sealed against said cover while the suction creating means is operating.

15. A suction cleaner filter chamber having an air inlet conduit extending thereinto, a paper filter bag having a flat wall in said chamber and having an inlet through said flat wall, means within said chamber for holding said filter inlet across and in communication with the inner end of said inlet conduit, said filter holding means comprising a perforated plate secured close to the inner end of said inlet conduit and projecting outwardly therefrom in juxtaposition to said flat wall, and a suction fan having its inlet in communication with the space on the opposite side of said perforated plate from said flat wall whereby the suction pressure of said suction fan is effective through the perforated plate to hold said flat wall snugly against said plate.

16. A suction cleaner filter chamber as defined in claim 15 including valve means for controlling communication between said suction fan and said opposite side of said perforated plate, means normally holding said valve means closed, and means depending upon the presence of a filter bag in said chamber for holding said valve means open.

References Cited in the file of this patent

UNITED STATES PATENTS

| | | |
|---|---|---|
| 2,192,224 | Forsberg | Mar. 5, 1940 |
| 2,242,278 | Yonkers | May 20, 1941 |
| 2,388,280 | Nuffer et al. | Nov. 6, 1945 |
| 2,444,762 | Waters | July 6, 1948 |
| 2,516,707 | Lewyt et al. | July 25, 1950 |
| 2,528,332 | Bergquist | Oct. 31, 1950 |
| 2,537,205 | Burmeister | Jan. 9, 1951 |
| 2,574,683 | Anderson | Nov. 13, 1951 |
| 2,621,757 | Anderson | Dec. 16, 1952 |
| 2,656,897 | Yonkers | Oct. 27, 1953 |
| 2,719,600 | Brace | Oct. 4, 1955 |